US007076608B2

(12) United States Patent
Arunagirinathan et al.

(10) Patent No.: US 7,076,608 B2
(45) Date of Patent: Jul. 11, 2006

(54) INVALIDATING CACHED DATA USING SECONDARY KEYS

(75) Inventors: Senthilnathan Arunagirinathan, Fremont, CA (US); Zheng Zeng, Foster City, CA (US); Yuhui Zhu, Fremont, CA (US); Shu Ling, San Mateo, CA (US); Fredric Goell, Foster City, CA (US); Xiang Liu, San Mateo, CA (US); Lawrence Jacobs, Redwood City, CA (US)

(73) Assignee: Oracle International Corp., Redwood Shores, CA (US)

( * ) Notice: Subject to any disclaimer, the term of this patent is extended or adjusted under 35 U.S.C. 154(b) by 308 days.

(21) Appl. No.: 10/726,112

(22) Filed: Dec. 2, 2003

(65) Prior Publication Data
US 2005/0120181 A1   Jun. 2, 2005

(51) Int. Cl.
*G06F 12/00* (2006.01)

(52) U.S. Cl. ............... 711/118; 711/133; 711/144; 709/203; 707/203

(58) Field of Classification Search ............ None
See application file for complete search history.

(56) References Cited

U.S. PATENT DOCUMENTS

| 5,408,649 | A | * | 4/1995 | Beshears et al. ............ 714/10 |
| 6,128,623 | A | * | 10/2000 | Mattis et al. ............ 707/103 R |
| 6,754,800 | B1 | * | 6/2004 | Wong et al. ............ 711/216 |
| 6,813,690 | B1 | * | 11/2004 | Lango et al. ............ 711/118 |
| 6,823,391 | B1 | * | 11/2004 | Deen et al. ............ 709/229 |
| 2002/0004813 | A1 | * | 1/2002 | Agrawal et al. ............ 709/201 |
| 2002/0111995 | A1 | * | 8/2002 | Mansour et al. ............ 709/203 |
| 2002/0116582 | A1 | * | 8/2002 | Copeland et al. ............ 711/133 |
| 2002/0143868 | A1 | * | 10/2002 | Challenger et al. ............ 709/203 |
| 2003/0187935 | A1 | * | 10/2003 | Agarwalla et al. ............ 709/206 |
| 2003/0217113 | A1 | * | 11/2003 | Katz et al. ............ 709/213 |
| 2004/0199621 | A1 | * | 10/2004 | Lau ............ 709/223 |

* cited by examiner

*Primary Examiner*—Matthew D. Anderson
*Assistant Examiner*—Michael Krofcheck
(74) *Attorney, Agent, or Firm*—Park, Vaughan & Fleming LLP

(57) ABSTRACT

A system and method for facilitating the invalidation of cached data, in which the data to be invalidated are identified using information other than a primary key. The primary key for a cached data object, such as a web page, may be a Uniform Resource Locator (URL). Instead of using an object's URL to identify to a cache the data to be invalidated, a secondary key is used, such as the object's data source or a template from which the object was created. An application communicates the secondary key to a cache, and the cache identifies cached objects that match the secondary key. Those data objects are then invalidated without having to issue multiple invalidation messages from the application.

31 Claims, 2 Drawing Sheets

INVALIDATING CACHED DATA USING SECONDARY KEYS

BACKGROUND

This invention relates generally to the field of computer systems. More particularly, a system and method are provided for using secondary keys to identify cached data to be invalidated.

In traditional caching schemes, each cached data object or item (e.g., a web page, a document, a set of data) is assigned an identifier that uniquely identifies the object throughout a network or other collection of computer systems. Thus, a cached web page may be identified by a URL (Uniform Resource Locator) or a URL combined with information that identifies a particular session or connection (e.g., a header or a cookie). When the cached page is requested from the cache, the request includes the URL, or other unique identifier, so that the cache can identify the correct page.

A data object's URL, when used as a unique identifier, is usually assigned by the source of the object, such as an application or database, and may be generated when the data object is generated, served or cached. The application is responsible for maintaining or remembering the mapping between the data objects it produces and the URLs assigned to the objects.

In many caching schemes, cached data objects must be specifically invalidated when they are updated or otherwise become obsolete. To invalidate a cached data object having a URL as its unique identifier, the data object's URL is specified by the application (or other entity) in an invalidation message directed to the cache in which the data object resides. Or, an invalidation message may include the same information that was used to generate the unique identifier; a cache receiving the invalidation message can thereby re-generate the identifier and invalidate the desired data item.

However, it can be very inefficient and time consuming to issue multiple invalidation messages when a number of data objects must be invalidated. In addition, a given data object may be cached multiple times, in one or multiple caches, under different URLs or other primary identifiers. This makes it even more onerous for an application that produces or serves the data to maintain mappings between data objects it provides to a cache and the identifiers the cache uses to identify them.

One situation in which a number of cached data objects may need to be invalidated is when a source of multiple data objects changes, which may cause their content to change. More generally, the cache must invalidate data objects from a given data source, when that source changes, in order to maintain consistency between the cache and the data source.

Therefore, there is a need for a system and a method for identifying to a cache multiple cached objects that must be invalidated, without having to specify the unique or primary identifiers for each object.

SUMMARY

In one embodiment of the invention, a system and methods are provided for facilitating the invalidation of cached data, in which the data to be invalidated are identified using information other than a primary key. The primary key for a cached data object, such as a web page, may be a Uniform Resource Locator (URL). Instead of using an object's URL to identify to a cache the data to be invalidated, a secondary key is used, such as an identifier of the object's data source, an identifier of a template from which the object was created, geographical address information, a name, a date, or some other information. An application or other entity communicates the secondary key to a cache, and the cache identifies cached objects that match the secondary key. Those data objects are then invalidated without having to issue multiple invalidation messages from the application.

DETAILED DESCRIPTION

Figure 1:
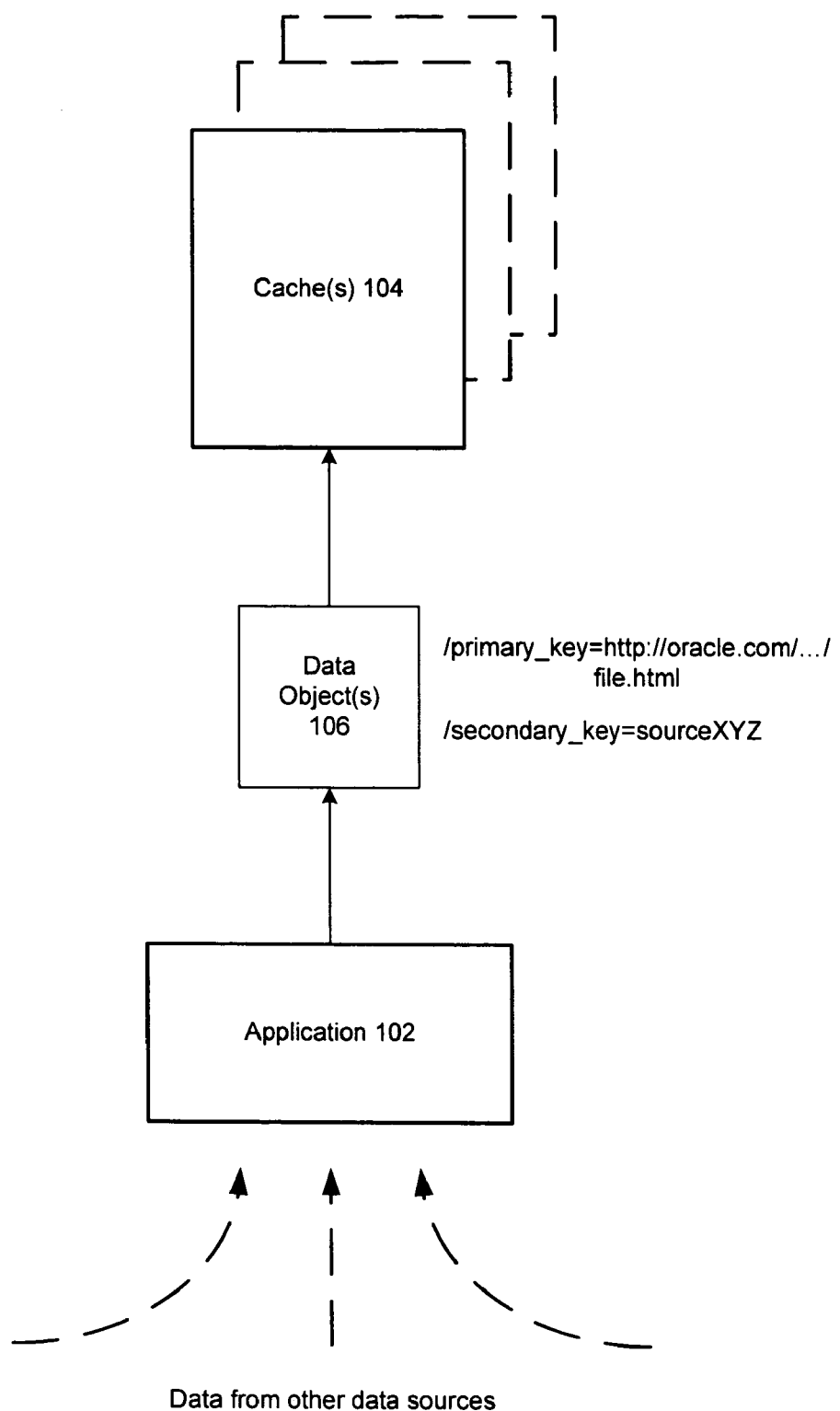
FIG. 1 depicts a system in which a secondary key may be used to facilitate invalidation of multiple cached data objects, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a computer configured to produce or cache data objects to serve to clients. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for identifying, to a cache, a common attribute of multiple data objects that are to be invalidated or that are to be the subject of some other action. In this embodiment, the attribute is identified using a secondary key, not the primary key or identifier (such as a URL) by which the cache identifies the data objects for the purpose of serving the objects.

Generally, a cache receives a data object to be cached from an application (e.g., a web server, an application server, a database or database management system). With the data object, the application provides a primary key that will be used to identify the data object in data requests, invalidation messages and/or other communications. The primary key is what a cache normally uses to identify its cached data objects.

In an embodiment of the invention described below, the data objects to be cached comprise web pages and/or portions of web pages. The primary keys used to identify these objects include URLs or other Uniform Resource Identifiers (URIs). One skilled in the art will appreciate that, in other embodiments of the invention, other types of data objects, items or datasets may be cached, and may be identified using other primary keys.

FIG. 1 is a block diagram describing one embodiment of the invention. In this embodiment, a data source produces cacheable data objects and/or data to be included in a cacheable data object. In particular, application 102 acts as a data source for generating new cacheable data objects, and/or may assemble cacheable data objects from data received from other data sources.

Cache(s) 104 are configured to cache and serve various data objects received from application 102 and/or other sources. In this embodiment, each data object a cache receives for caching is identified by a primary key, such as a URL. The primary key may be assembled by application 102 or some other source of the data object, and is provided to the cache when the data object is delivered. Illustratively, the primary key is also specified in requests for the data object that are received by the cache from users or other clients. Thus, the primary key of a cached data object comprises information a cache may use to uniquely identify the data object.

In the illustrated embodiment of the invention, along with a primary key, application 102 provides a secondary key or secondary piece of information when it delivers data object 106 to cache(s) 104. In this embodiment, the secondary key comprises information identifying a source of the data object. The source may be a source from which application 102 received the object (or a portion of the object), or may be application 102 itself. Information included in the secondary key may comprise a name, address, URL or other identification of the source.

Other examples of secondary keys include: geographical or mailing address information (e.g., box, street, city, state, country), a date, a database key, a name (of a person or other thing), a security symbol, a product identifier or code (e.g., a UPC (Universal Product Code), an RFID (Radio Frequency Identification), an ISBN (International Standard Book Number)), or some other information. Neither the name of the secondary key (e.g., "secondary," "source") nor its content are limited.

A single data object may have multiple secondary keys. Other than the object's data source, different secondary keys may identify attributes such as the template used to assemble the object, a unique identifier (other than the object's primary key) that can be used to identify the object at its source or other location (e.g., a document identifier), an identifier associated with the data object in a different cache or other storage location, etc.

After data object 106 is stored in a cache 104, it and any other data objects from the same source can be invalidated using a single invalidation message that identifies their common data source. Thus, instead of sending multiple invalidation messages, in which each data object is identified by its primary key, application 102 can send a single invalidation message to invalidate multiple objects. This may be done, for example, when the source of the data objects changes.

Illustratively, cache 104 stores information identifying the secondary key(s) of each valid data object it has cached. It also stores information (e.g., a hash table) for mapping each secondary key of its cached objects to all valid cached data objects having that key. For example, this information may map from a secondary key to the objects' primary keys.

When the cache receives an invalidation message specifying a secondary key of one or more cached data objects to be invalidated, it can quickly identify those data objects and invalidate them. This may remove the need for application 102 to maintain mappings between all data objects it provides to cache(s) 104 and their data sources.

Further, data object 106 may be cached under different URLs, in the same or different caches. For example, one URL may be human-readable while another is more machine-oriented and less decipherable by a human. By using a secondary key such as the object's data source to identify the object, all cached versions of the object can be quickly and easily identified. Therefore, application 102 need not maintain all of the URLs of object 106, if it has multiple URLs, to invalidate them all.

Also, data object 106 may be cached in different forms, in the same or different caches. For example, it may be cached in HTML (HyperText Markup Language) form in cache 104, but in WML (Wireless Markup Language), XML (eXtensible Markup Language) or other form in another cache. Again, using the secondary key of object 106, which will be the same regardless of the form or URL with which it is cached, will allow all forms to be easily invalidated.

In another embodiment of the invention, application 102 assembles data object 106 and/or other objects using a particular template. In this embodiment, when the objects are cached, the caches receive information identifying the template (e.g., name, address, URL) as a secondary key. Then, if the template changes or objects assembled using the template should be invalidated for some other reason, application 102 can quickly and easily invalidate them using the secondary key. In this scheme, application 102 does not need to separately lookup or otherwise determine each object's primary key and provide that key in invalidation messages.

Figure 2:
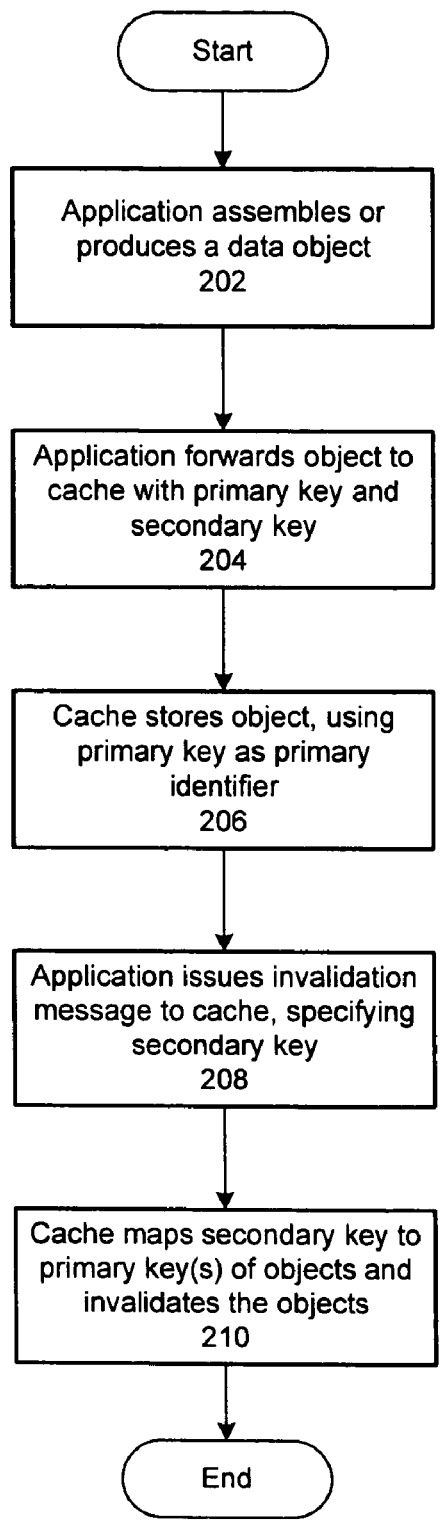
FIG. 2 is a flowchart illustrating one method of facilitating invalidation of multiple cached objects through the use of a secondary key, in accordance with an embodiment of the invention.

FIG. 2 is a flowchart demonstrating a method of using a secondary key to facilitate the invalidation of multiple cached data object, according to one embodiment of the invention.

In state 202, an application (e.g., a web server, a portal, an application server, a database) generates a new cacheable data object. The application may create the data object anew, or assemble it from other data. For example, a portal may assemble a web page from data drawn from any number of sources.

In state 204, the application forwards the data object to a cache, perhaps in response to a request for the object from a client. With the object, the application provides a primary key (e.g., a URL, an address) for uniquely identifying the object within a network or other collection of computer systems. The application also provides a secondary key, which may identify the application, another source of some or all of the data within the object, a template used to generate the object, an identifier that uniquely identifies the object to the application or other entity, etc.

In state 206, the cache stores the object and uses the primary key as the primary means of identifying it (e.g., for retrieving and serving it in response to client requests). The object may be stored in multiple forms or versions in the cache, and/or may also be stored in a different form or version in a different cache.

In state 208, the application (or some other entity) issues an invalidation message to the cache, in which the data object's secondary key is identified. In this embodiment, the object's primary key may or may not be included in the message. The message may also be directed to any number of other caches, or may be forwarded by the cache to one or more other caches.

In state 210, the cache receives the invalidation message and uses the secondary key provided in the message to lookup any data objects it has cached that have the same secondary key. For example, the cache may maintain a mapping of cached data objects' secondary keys to the objects' primary keys. The cache can then use the primary keys to retrieve and invalidate the objects. Or, the cache may be able to directly retrieve or invalidate the data object based on its secondary key. The illustrated method then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of using a secondary key to facilitate invalidation of cached data, comprising:
    at a first data source:
        associating a URL (Uniform Resource Locator) with a first data object;
        forwarding the first data object to a cache, along with:
            a primary key comprising the URL; and
            a secondary key configured to identify the first data source;
    caching the first data object at the cache, wherein the cache is configured to cache multiple versions of the first data object, and wherein each version is cached with a different primary key and the same secondary key;
    issuing an invalidation message from the first data source to the cache, wherein said invalidation message comprises the identifier; and
    at the cache, using the identifier to identify one or more data objects for invalidation, including the first data object.

2. The method of claim 1, wherein:
    the primary key uniquely identifies the first data object; and
    the secondary key identifies a set of data objects having the same data source.

3. The method of claim 1, further comprising, at the cache:
    maintaining a mapping of said secondary key to URLs of the one or more data objects.

4. The method of claim 1, further comprising, at the cache:
    maintaining a mapping of the URL of the first data object to one or more secondary keys of the first data object, including said secondary key.

5. The method of claim 1, wherein the invalidation message is issued after the source of the one or more data objects changes from the first data source to a second data source.

6. A computer readable medium storing instructions that, when executed by a computer, cause the computer to perform a method of using a secondary key to facilitate invalidation of cached data, wherein the computer-readable medium includes one of a volatile memory, a non-volatile memory, a disk drive, a magnetic tape, a compact disc, a digital versatile disk, and a digital video disk, the method comprising:
    at a first data source:
        associating a URL (Uniform Resource Locator) with a first data object;
        forwarding the first data object to a cache, along with:
            a primary key comprising the URL; and
            a secondary key configured to identify the first data source;
    caching the first data object at the cache, wherein the cache is configured to cache multiple versions of the first data object, and wherein each version is cached with a different primary key and the same secondary key;
    issuing an invalidation message from the first data source to the cache, wherein said invalidation message comprises the identifier; and
    at the cache, using the identifier to identify one or more data objects for invalidation, including the first data object.

7. A computer-implemented method of facilitating invalidation of cached data using a secondary key, the method comprising:
    at an application configured to produce cacheable data objects, associating with a first data object:
        a first primary key configured to uniquely identify the first data object within a collection of computer systems; and
        a first secondary key configured to identify multiple data objects having a common attribute;
    when the first data object is provided to a cache to be cached, providing said first secondary key, wherein the cache is configured to cache multiple versions of the first data object, and wherein each version is cached with a second primary key and the first secondary key; and
    issuing an invalidation message from the application to the cache to invalidate the multiple data objects, wherein the invalidation message includes said first secondary key.

8. The method of claim 7, wherein the first primary key is identified to the cache by a client when the client desires to receive the first data object.

9. The method of claim 8, wherein the first secondary key is not known to the client.

10. The method of claim 7, wherein said first secondary key comprises an identifier of the application.

11. The method of claim 7, wherein:
    the common attribute is a data source; and
    said first secondary key comprises an identifier of a source of the first data object.

12. The method of claim 7, wherein:
    the common attribute is a template used to produce the multiple data objects; and
    said first secondary key comprises an identifier of the template.

13. The method of claim 7, further comprising, at the cache:
    receiving the invalidation message;
    mapping said first secondary key to primary keys of the multiple data objects; and
    invalidating the multiple data objects.

14. The method of claim 7, wherein said first secondary key comprises a security symbol.

15. The method of claim 7, wherein said first secondary key comprises a name.

16. The method of claim 7, wherein said first secondary key comprises a date.

17. The method of claim 7, wherein said first secondary key comprises address information.

18. The method of claim 7, wherein said first secondary key comprises a product identifier.

19. A computer readable medium storing instructions that, when executed by a computer, cause the computer to perform a method of facilitating invalidation of cached data using a secondary key, wherein the computer-readable medium includes one of a volatile memory, a non-volatile memory, a disk drive, a magnetic tape, a compact disc, a digital versatile disk, and a digital video disk, the method comprising:
   at an application configured to produce cacheable data objects, associating with a first data object:
      a first primary key configured to uniquely identify the first data object within a collection of computer systems; and
      a first secondary key configured to identify multiple data objects having a common attribute;
   when the first data object is provided to a cache to be cached, providing said first secondary key, wherein the cache is configured to cache multiple versions of the first data object, and wherein each version is cached with a second primary key and the first secondary key; and
   issuing an invalidation message from the application to the cache to invalidate the multiple data objects, wherein the invalidation message includes said first secondary key.

20. A computer-implemented method of facilitating invalidation of cached data using a secondary key, the method comprising:
   receiving at a cache a first data object to be cached, wherein the first data object is accompanied by:
      a first primary key configured to uniquely identify the first data object within a network; and
      a first secondary key comprising information common to multiple data objects in the network, including the first data object;
      wherein the cache is configured to cache multiple versions of the first data object, and wherein each version is cached with a second primary key and the first secondary key;
   maintaining at the cache a mapping between said first secondary key and primary keys of the multiple data objects; and
   in response to receipt at the cache of an invalidation message identifying said first secondary key:
      identifying the primary keys of the multiple data objects; and
      invalidating the multiple data objects.

21. The method of claim 20, wherein said invalidation message does not specify the primary keys of the multiple data objects.

22. The method of claim 20, wherein requests received at the cache to serve the first data object include the first primary key but not said first secondary key.

23. The method of claim 20, wherein said first secondary key comprises a security symbol.

24. The method of claim 20, wherein said first secondary key comprises a name.

25. The method of claim 20, wherein said first secondary key comprises a date.

26. The method of claim 20, wherein said first secondary key comprises address information.

27. The method of claim 20, wherein said first secondary key comprises a product identifier.

28. A computer readable medium storing instructions that, when executed by a computer, cause the computer to perform a method of facilitating invalidation of cached data using a secondary key, wherein the computer-readable medium includes one of a volatile memory, a non-volatile memory, a disk drive, a magnetic tape, a compact disc, a digital versatile disk, and a digital video disk, the method comprising:
   receiving at a cache a first data object to be cached, wherein the first data object is accompanied by:
      a first primary key configured to uniquely identify the first data object within a network; and
      a first secondary key comprising information common to multiple data objects in the network, including the first data object;
      wherein the cache is configured to cache multiple versions of the first data object, and wherein each version is cached with a second primary key and the first secondary key
   maintaining at the cache a mapping between said first secondary key and primary keys of the multiple data objects; and
   in response to receipt at the cache of an invalidation message identifying said first secondary key:
      identifying the primary keys of the multiple data objects; and
      invalidating the multiple data objects.

29. A system for facilitating invalidation of cached data objects, comprising:
   a first cache configured to cache data objects for serving to clients; and
   a data source, coupled to the first cache via a network, wherein the data source is configured to:
      produce data objects for caching in the cache;
      associate with each data object a primary key configured to uniquely identify the data object within the network;
      associate with each data object a secondary key, wherein each secondary key is associated with a set of data objects having a common attribute; and
      issue to the cache an invalidation message comprising a first secondary key to facilitate the invalidation of a first set of data objects;
   wherein:
      the first cache is configured to cache multiple versions of a first data object; and
      each said version is cached with a different primary key and the same secondary key.

30. The system of claim 29, wherein a client is configured to receive the primary key of a data object it desires, but not the secondary key.

31. The system of claim 29, further comprising:
   a second cache configured to cache a first data object cached by the first cache, with a different primary key and the same secondary key.

* * * * *